United States Patent
Reidlinger et al.

(10) Patent No.: US 9,133,364 B2
(45) Date of Patent: Sep. 15, 2015

(54) POLYURETHANE DISPERSIONS, A PROCESS OF MAKING, AND A METHOD OF USE THEREOF

(75) Inventors: Gerhard Reidlinger, Graz (AT); Anton Arzt, Neu-Tillmitsch (AT); Michael Gobec, Graz (AT); Gerlinde Petritsch, Graz (AT)

(73) Assignee: Allnex Austria GmbH, Werndorf (AT)

( * ) Notice: Subject to any disclaimer, the term of this patent is extended or adjusted under 35 U.S.C. 154(b) by 173 days.

(21) Appl. No.: 13/811,807

(22) PCT Filed: Jul. 24, 2011

(86) PCT No.: PCT/EP2011/062695
§ 371 (c)(1),
(2), (4) Date: Mar. 20, 2013

(87) PCT Pub. No.: WO2012/013611
PCT Pub. Date: Feb. 2, 2012

(65) Prior Publication Data
US 2013/0171357 A1 Jul. 4, 2013

(30) Foreign Application Priority Data
Jul. 24, 2010 (EP) .................................... 10170725

(51) Int. Cl.
| | | |
|---|---|---|
| *C09D 175/06* | (2006.01) | |
| *C08G 18/40* | (2006.01) | |
| *C08G 18/42* | (2006.01) | |
| *C08G 18/76* | (2006.01) | |
| *C08G 18/10* | (2006.01) | |
| *C09D 175/12* | (2006.01) | |

(52) U.S. Cl.
CPC .............. *C09D 175/06* (2013.01); *C08G 18/10* (2013.01); *C08G 18/4063* (2013.01); *C08G 18/4288* (2013.01); *C08G 18/765* (2013.01); *C09D 175/12* (2013.01)

(58) Field of Classification Search
CPC .............. C08G 18/4288; C08G 18/32; C08G 18/3203; C08G 18/3225; C08G 18/3231
USPC ........................................................ 525/453
See application file for complete search history.

(56) References Cited

U.S. PATENT DOCUMENTS

| | | | |
|---|---|---|---|
| 4,885,392 A | 12/1989 | Lenz et al. | |
| 6,166,150 A | 12/2000 | Wilke et al. | |
| 6,359,060 B1 | 3/2002 | Schafheutle et al. | |
| 6,559,225 B1 * | 5/2003 | Irle et al. .................... | 524/839 |
| 6,610,784 B1 * | 8/2003 | Overbeek et al. ............. | 525/178 |
| 8,119,757 B2 * | 2/2012 | Reidlinger et al. ............. | 528/26 |
| 8,318,855 B2 * | 11/2012 | Schafheutle et al. ......... | 524/591 |
| 8,372,914 B2 * | 2/2013 | Reidlinger et al. ........... | 525/131 |
| 2010/0048812 A1 * | 2/2010 | Hofland et al. ............... | 524/591 |

FOREIGN PATENT DOCUMENTS

| | | |
|---|---|---|
| DE | 3644371 A1 | 7/1988 |
| EP | 640632 A1 | 3/1995 |
| EP | 1026186 A1 | 8/2000 |
| EP | 1705197 A1 | 9/2006 |
| EP | 1849810 A1 | 10/2007 |

OTHER PUBLICATIONS

International Search Report for PCT/EP2011/062695 mailed Oct. 7, 2011.

* cited by examiner

*Primary Examiner* — Mike M Dollinger
(74) *Attorney, Agent, or Firm* — Drinker Biddle & Reath LLP

(57) ABSTRACT

The invention relates to a polyurethane P comprising a moiety derived from a polyfunctional isocyanate F, and a hydroxy-functional compound ABCE made from a grafted fatty acid AB which in turn is made from a fatty acid A having at least one olefinic unsaturation, and grafted with a mixture B of olefinically unsaturated monomers which mixture comprises at least one acid-functional olefinically unsaturated monomer B1, wherein the grafted fatty acid AB has on average at least 1.1 acid groups per molecule, at least one polyhydric alcohol C having at least two hydroxyl groups, and at least one fatty acid E, to a process of making this polyurethane, and to a method of use thereof in the form of an aqueous dispersion to formulate coating compositions.

12 Claims, No Drawings

POLYURETHANE DISPERSIONS, A PROCESS OF MAKING, AND A METHOD OF USE THEREOF

CROSS-REFERENCE TO RELATED APPLICATIONS

This application is a national stage application (under 35 U.S.C. §371) of PCT/EP2011/062695, filed Jul. 24, 2011, which claims benefit of European application 10170725.5, filed Jul. 24, 2010.

FIELD OF THE INVENTION

This invention relates to polyurethane dispersions that comprise moieties derived from fatty acids, to a process of making such polyurethane dispersions, and a method of use thereof.

BACKGROUND OF THE INVENTION

Polyurethane dispersions comprising moieties derived from fatty acids having a number of carbon atoms of from 12 to 40 have already been described, in EP 1 026 186 A1. These polyurethane resins have been made by reacting drying or semi-drying oils with low molar mass hydroxy compounds having two or more hydroxyl groups and from two to twelve carbon atoms, and reacting this intermediate with high molar mass polyols having a number average molar mass of from 400 g/mol to 20 kg/mol, compounds that have at least two groups that are reactive towards isocyanate groups, and at least one group that may be an acid group or a group forming a cationic group after neutralisation, and polyfunctional isocyanate compound to form a prepolymer which is neutralised, dispersed in water and optionally reacted with a chain extender.

Similar polyurethane dispersion have been disclosed in EP 0 640 632 A1 where an isocyanate functional prepolymer is made from a diisocyanate, a dihydroxy alkanoic acid, and a drying oil which has been transesterified in a separate step with a polyfunctional alcohol to form a hydroxy-functional fatty acid ester, the prepolymer is then neutralised, and contacted with water and a diamine to form a chain-extended polyurethane-urea dispersion which can be crosslinked by air-drying.

In the case of acid-modified polyurethanes which are made water-dilutable by incorporation of anionic groups, the method of choice to introduce acid groups is co-reaction of acids that have at least two, preferably exactly two, further groups which may be hydroxyl, amino, or mercaptane groups that react with isocyanate groups to form urethane, urea, or thiourea linkages. Preferred are dihydroxyalkanoic acids such as dimethylol propionic acid or dimethylol butyric acid which have an acid group that is sufficiently inert towards the isocyanate groups due to steric effects to minimise decarboxylation and formation of amines by the reaction between carboxylic acid and isocyanate, which amine then usually reacts with a further isocyanate group to form a urea structure. As this reaction consumes a part of the isocyanate, there is a shift in stoichiometry which either leads to lower molar masses of the polyurethane formed, or which must be compensated by increasing the amount of polyisocyanate which may lead to unwanted chain branching by formation of allophanates. A further drawback of the use of dihydroxyalkanoic acids is their limited solubility which necessitates the addition of solvents such as N-methylpyrrolidone or acetone which have to be removed in a separate distillation step, or, when remaining in the dispersion, add to the VOC of paints based on these polyurethane dispersions as binders. Other acids having additional groups that react with isocyanate groups such as propoxylated 3-hydroxy-2-hydroxymethyl-propane-1-sulphonic acid and 2-(2-aminoethylamino) ethane sulphonic acid are generally used in the form of their sodium salts, and have presently largely been replaced by the said dihydroxyalkanoic acids.

It is therefore an object of the invention to at least partly replace these said carboxylic or sulphonic acids that have two further groups that are reactive towards isocyanate groups, in order to suppress side reactions of the isocyanate, and also to do away with the need to add solvents to dissolve and thereby make reactive these acids.

SUMMARY OF THE INVENTION

This problem has been solved by using a polyol component having at least one hydroxyl group per molecule in the synthesis of a polyurethane which polyol component is a polyol ABCDE having, on average, at least one hydroxyl group per molecule, made from a grafted fatty acid AB which in turn is made from a fatty acid A having at least one olefinic unsaturation, and grafted with a mixture B of olefinically unsaturated monomers which mixture comprises at least one acid-functional olefinically unsaturated monomer B1, wherein the grafted fatty acid AB has on average at least 1.1 acid groups per molecule, at least one polyhydric alcohol C having at least two hydroxyl groups, polybasic organic acids D having at least two acid groups per molecule, and at least one fatty acid E. To form the polyurethane P, this polyol ABCDE is reacted with a polyfunctional isocyanate F, and optionally, at least one of chain extenders I having at least two functional groups that react with isocyanate groups, and optionally, a polyhydric alcohol G having a molar mass of up to 2000 g/mol and at least two hydroxyl groups per molecule, and further optionally, a dihydroxyalkanoic acid H having a sterically hindered acid group where the carbon atom carrying the carboxyl group is a tertiary or quaternary carbon atom, and still further optionally, monofunctional compounds J also referred to as chain stoppers that have only one group that is reactive towards isocyanate groups, and also optionally, compounds K that have at least two different kinds of groups that have different reactivity towards isocyanate groups, selected from the group consisting of primary hydroxyl groups —CH$_2$OH, secondary hydroxyl groups >CH(OH), tertiary hydroxyl groups >C(OH)—, primary amino groups —NH$_2$, secondary amino groups >NH, and mercapto groups —SH, which are used to impart additional functional groups into the polyurethane.

In the reaction between the polyol ABCDE and the polyfunctional isocyanate F, the stoichiometry has to be selected in a way to make a polyurethane, i.e. the amount of substance n(—NCO) of isocyanate groups in F has to be at least 0.9 of the amount of substance n(—OH) of hydroxyl groups in ABCDE, in other words, the ratio n(—NCO)/n(—OH)≥0.9 mol/mol, but preferably not more than 1.3 mol/mol. Preferably, this ratio n(—NCO)/n(—OH) is at least 1.05 mol/mol, and with particular preference, at least 1.1 mol/mol. An excess of isocyanate groups is also needed in order to add a chain-extension step, as is well known to a person skilled in the art.

A further object of the invention is a process to make the polyurethane P in a multi-step reaction, where in the first step, a fatty acid A having at least one olefinic unsaturation is grafted with a mixture B of olefinically unsaturated monomers which mixture comprises at least one acid-functional olefinically unsaturated monomer B1, to provide a grafted fatty acid AB having on average at least 1.1 acid groups per molecule, in the second step, a compound ABCDE which is hydroxy-functional is made by reacting the grafted fatty acid AB with at least one polyhydric alcohol C having at least two hydroxyl groups, and at least one fatty acid E, in the third step, a polyurethane P is made by reacting the hydroxy-functional compound ASCE with a polyfunctional isocyanate F, and at least one of chain extenders I having at least two functional groups that react with isocyanate groups, and optionally, a low molar mass polyhydric alcohol G having a molar mass of up to 400 g/mol and at least two hydroxyl groups per molecule, further optionally, a dihydroxyalkanoic acid H having a sterically hindered acid group where the carbon atom carrying the carboxyl group is a tertiary or quaternary carbon atom, and still further optionally, monofunctional compounds J also referred to as chain stoppers that have only one group that is reactive towards isocyanate groups, and also optionally, compounds K that have at least two different kinds of groups that have different reactivity towards isocyanate groups, selected from the group consisting of primary hydroxyl groups —CH$_2$OH, secondary hydroxyl groups >CH(OH), tertiary hydroxyl groups >C(OH)—, primary amino groups —NH$_2$, secondary amino groups >NH, and mercapto groups —SH, which are used to impart additional functional groups into the polyurethane.

A further object of the invention is a method of use of the polyurethane P as described hereinabove a binder resin in coating compositions, comprising providing an aqueous dispersion of P, which additionally contains at least one siccative S which is a salt of a transition metal from one of groups 3 (new IUPAC nomenclature; Sc, Y, La) to 12 (Zn, Cd, Hg) of the periodic system of the elements, which selection includes the elements of the groups 4, 5, 6, 7, 8, 9, 10, and 11, or a salt of a rare earth metal, where each of the metals has at least two valence states, and an organic acid, adding at least one of a pigment, a filler, a flow additive, a levelling additive, a wetting additive, an antisettling agent, a light stabiliser, a coalescing agent, and an antioxidant, and applying the coating composition to a substrate by brushing, spraying, dipping, blade coating, roller coating, or curtain coating.

DETAILED DESCRIPTION OF THE PREFERRED EMBODIMENTS

The polyurethane P preferably has an acid number of from 10 mg/g to 120 mg/g, particularly preferably of from 20 mg/g to 100 mg/g, and especially preferred, from 30 mg/g to 80 mg/g. The content of urethane groups, expressed as mass fraction of urethane groups, —NH—CO—O—, M=59.02 g/mol, in the resin is preferably from 2% to 10%, particularly preferably from 3% to 9%, and especially preferred, from 4% to 8%.

The grafted fatty acids AB are graft products of fatty acids A having at least one olefinic unsaturation, on average, per molecule, and olefinically unsaturated linear or preferably branched aliphatic acids B1 preferably having from three to ten carbon atoms. The fatty acids A preferably have from 6 to 30 carbon atoms and have at least one olefinic double bond in their molecules. Useful fatty acids include, but are not limited to, palmitoleid acid, oleic and elaidic acids, gadoleic acid, erucic acid, sorbic acid, linolic acid, linolenic acid, eleostearic acid, arachidonic acid, and clupanodonic acid, as well as their mixtures, particularly those mixtures that are made from natural oils such as cottonseed oil, linseed oil, palm oil, rapeseed oil, safflower oil, soybean oil, and sunflower oil. These latter mixtures of fatty acids are referred to as cottonseed oil fatty acids, linseed oil fatty acids, palm oil fatty acids, rapeseed oil fatty acids, safflower oil fatty acids, soybean oil fatty acids, and sunflower oil fatty acids.

The olefinically unsaturated linear or preferably branched aliphatic acids B1 have at least one, preferably one, carboxyl group and at least one, preferably one, olefinic unsaturation, and they are preferably branched. It is particularly preferred that the carbon atom to which the carboxyl group is bound carries a bulky substituent such as a methyl, ethyl or propyl group such as in methacrylic acid, ethacrylic acid, 2-propylacrylic acid, and 2,3-dimethylacrylic (tiglic) acid.

In the grafting step, in addition to the acids B1, other olefinically unsaturated monomers B' capable of radical copolymerisation may also be grafted onto the fatty acids A, selected from the group consisting of acid functional monoesters B1' of aliphatic alcohols and olefinically unsaturated dicarboxylic acids such as monomethyl maleinate, esters B2 of aliphatic alcohols and olefinically unsaturated carboxylic acids where in addition to the branched aliphatic unsaturated acids B1, also linear aliphatic unsaturated acids such as acrylic acid, vinyl acetic acid, crotonic and isocrotonic acid may be used to form the esters B2, such as methyl (meth)acrylate, ethyl (meth)acrylate, isobutyl (meth)acrylate, and 2-ethylhexyl (meth)acrylate, as well as diesters of olefinically unsaturated dicarboxylic acids such as dimethyl maleinate, hydroxy functional esters B3 of di- and polyhydric alcohols and the olefinically unsaturated carboxylic acids mentioned supra, such as hydroxyethyl (meth)acrylate and hydroxypropyl (meth)acrylate, and aromatic vinyl compounds B4 such as styrene, p-methylstyrene and vinyl toluene, and other copolymerisable vinyl compounds B5 such as vinyl acetate, vinyl chloride, methyl vinyl ketone, methyl vinyl and allyl ethers, and (meth)acrylonitrile.

The polyhydric aliphatic alcohols C are preferably linear or branched alcohols having from 2 to 12 carbon atoms and at least two hydroxyl groups. Preferred alcohols are ethylene glycol and propylene glycol, 1,3-propane diol, glycerol, trimethylol ethane, trimethylol propane, diglycerol, ditrimethylol ethane and ditrimethylol propane, erythritol, pentaerythritol, dipentaerythritol and sugar alcohols such as sorbitol, mannitol, and arabitol.

The fatty acids E may be saturated or unsaturated, or may be mixtures of saturated fatty acids, of unsaturated fatty acids, and of saturated and unsaturated fatty acids. They preferably have from 6 to 30 carbon atoms. Useful fatty acids are particularly lauric, myristic, palmitic, margaric, stearic, arachidic, behenic, lignoceric, hexacosanoic, triacontanoic, palmitoleic, oleic, erucic, sorbic, linoleic, linolenic, eleostearic, arachidonic, and clupanodonic acids, as well as mixtures of fatty acids derived from natural oils, particularly cottonseed oil fatty acids, linseed oil fatty acids, palm oil fatty acids, rapeseed oil fatty acids, rubber seed oil fatty acids, safflower oil fatty acids, soybean oil fatty acids, sunflower oil fatty acids, and tall oil fatty acids.

The polyfunctional isocyanates F are preferably selected from aromatic and aliphatic isocyanates, preferably diisocyanates, such as toluoylene diisocyanate (TDI), bis-(4-isocyanatophenyl)methane (MDI), bis-(4-isocyanatocyclohexyl) methane (HMDI), tetramethyl-m-xylylene diisocyanate (TMXDI), 1,6-diisocyanatohexane (HDI), and isophorone diisocyanate (IPDI). Mixtures of these may also be used.

The polybasic organic acids D which are used to make hydroxy-functional compounds ABCDE, are preferably dicarboxylic or tricarboxylic acids and may be aliphatic linear, branched, or cyclic, and aromatic in nature, and may preferably be selected from the group consisting of phthalic acid, trimellithic acid, tetrahydrophthalic acid, maleic acid, adipic acid, malonic acid, oxalic acid, succinic acid, and the anhydrides thereof, to the extent that they exist.

The compounds I are the so-called chain extenders. Suitable such compounds include the NCO-reactive and preferably difunctional compounds which are known for this purpose, and which normally have number average molar masses of up to 800 g/mol, especially preferred up to 400 g/mol. Examples that my be mentioned here include water, hydrazine, dihydrazides of dicarboxylic acids, such as adipic dihydrazide, diamines such as ethylenediamine, 1,3-diaminopropane, 1,4-diaminobutane, methylpentandiamine, and hexamethylenediamine, it being possible for the amines to carry substituents as well, such as OH groups. Such polyamines are described, for example in DE 36 44 371. The mass fraction derived from component I in the polyurethane resin is customarily between 0.5% and 10%, preferably between 2% and 6%, based on the mass of the polyurethane resin P.

The monofunctional compounds J that can optionally be used are also referred to as chain stoppers that have only one group that is reactive towards isocyanate groups. Use may be made of monohydric alcohols, such as butanol or 2-ethylhexanol, and secondary monoamines such as diethylamine or dibutyl amine, N-methylpiperidine or morpholine.

The compounds K that can optionally be used have at least two different kinds of functional groups that have different reactivity towards isocyanate groups, selected from the group consisting of primary hydroxyl groups —$CH_2OH$, secondary hydroxyl groups >CH(OH), tertiary hydroxyl groups >C(OH)—, primary amino groups —$NH_2$, secondary amino groups >NH, and mercapto groups —SH, which are used to impart additional functional groups into the polyurethane. Useful compounds are diethanolamine, diisopropanolamine, and N-aminoethylpiperazine.

The polyurethane dispersions thus obtained have a very low mass fraction of solvents, or no solvents at all, and can be used to formulate coating compositions that can be applied to plastics, particularly amorphous thermoplastics that are prone to stress cracking such as polycarbonate or polyestercarbonate. It can also be used as coating compositions for metals, for wood, and for concrete.

Due to the presence of fatty acids which are preferably drying fatty acids having olefinic unsaturations, the polyurethanes P can be used to formulate air-drying coating compositions. It is also possible, however, to add crosslinkers such as non-blocked polyfunctional isocyanates to enhance crosslinking. Other useful crosslinkers L are preferably selected from the group consisting of blocked isocyanates L1, amino resin crosslinkers L2 based on at least partially etherified reaction products of organic amino compounds L21 and aliphatic aldehydes L22, and alkylcarbamoyl triazines L3.

EXAMPLES

In these examples, mixtures of fatty acids from natural sources are identified by the name of the natural source, and are used in commercially available qualities at the time of filing of the priority application of this patent application. The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

Example 1

Grafted Fatty Acids 71 g of linseed oil fatty acid were charged in a reactor and heated to 140° C. A monomer mixture consisting of 55 g of isobutyl methacrylate, 10 g of para-methyl styrene and 35 g of methacrylic acid together with 4 g of di-tert. butyl peroxide was added continuously over eight hours. The mixture was kept at 140° C. thereafter until a conversion to polymer of at least 99% had been reached, as witnessed by the mass fraction of solids measured. Finally, the reaction mixture was diluted with xylene. The solution had a mass fraction of solids of 75%, and an acid number of 203 mg/g.

Example 2

Polyol 270 g of pentaerythritol, 150 g of phthalic anhydride and 1000 g of soy bean oil fatty acid were charged to a reactor and heated to 250° C. The mixture was kept under esterification conditions, viz., at a constant temperature of 250° C. under removal of water by azeotropic distillation with xylene until an acid number of approximately 4 mg/g or lower had been reached. The reactor was then cooled down to approximately 170° C., and 1000 g of the grafted fatty acid mixture of example 1 were charged to the reactor. The mixture was heated up to 205° C. and stirred at this temperature until the mixture was transparent (about twenty minutes). The reaction mixture was then cooled down to 170° C., and residual xylene was removed by distillation under reduced pressure until a mass fraction of solids of at least 99% had been reached. The mixture was kept at 170° C. under stirring until the final acid number of 50 mg/g was reached and then cooled down. The hydroxyl number of this polyol was in the range of from 36 mg/g to 44 mg/g when repeating this example, with an average of 40 mg/g.

Example 3

Polyol 270 g of pentaerythritol, 150 g of phthalic anhydride and 770 g of coconut oil fatty acid were charged to a reactor and heated to 250° C. The mixture was kept under esterification conditions, viz., at a constant temperature of 250° C. under removal of water by azeotropic distillation with xylene until an acid number of approximately 4 mg/g had been reached. The reactor was then cooled down to approximately 170° C., and 1000 g of the grafted fatty acid mixture of example 1 were charged to the reactor. The mixture was heated up to 205° C. and stirred at this temperature until the mixture was transparent (about twenty minutes). The reaction mixture was then cooled down to 170° C., and residual xylene was removed by distillation under reduced pressure until a mass fraction of solids of at least 99% had been reached. The mixture was kept at 170° C. under stirring until the final acid number of 50 mg/g was reached and then cooled down. The hydroxyl number of this polyol was in the range of from 36 mg/g to 44 mg/g when repeating this example, with an average of 40 mg/g.

Example 4

Polyol 270 g of pentaerythritol, 150 g of phthalic anhydride and 720 g of tall oil fatty acid were charged to a reactor and heated to 250° C. The mixture was kept under esterification conditions, viz., at a constant temperature of 250° C. under removal of water by azeotropic distillation with xylene, until an acid number of approximately 4 mg/g had been reached. The reactor was then cooled down to approximately 170° C., and 1000 g of the grafted fatty acid mixture of example 1 were charged to the reactor. The mixture was heated up to 205° C. and stirred at this temperature until the mixture was transparent (about twenty minutes). The reaction mixture was then cooled down to 170° C., and residual xylene was removed by distillation under reduced pressure until a mass fraction of solids of at least 99% had been reached. The mixture was kept at 170° C. under stirring until the final acid number of 50 mg/g was reached and then cooled down. The hydroxyl number of this polyol was in the range of from 65 mg/g to 70 mg/g when repeating this example, with an average of 67 mg/g.

Example 5

Polyol 136 g of pentaerythritol and 560 g of tall oil fatty acid were charged to a reactor and heated to 250° C. The mixture was kept under esterification conditions, viz., at a constant temperature of 250° C. under removal of water by azeotropic distillation with xylene, until an acid number of approximately 4 mg/g had been reached. The reactor was then cooled down to approximately 170° C., and 450 g of the grafted fatty acid mixture of example 1 were charged to the reactor. The mixture was heated up to 205° C. and stirred at this temperature until the mixture was transparent (about twenty minutes). The reaction mixture was then cooled down to 170° C., and residual xylene was removed by distillation under reduced pressure until a mass fraction of solids of at least 99% had been reached. The mixture was kept at 170° C. under stirring until the final acid number of 45 mg/g was reached and then cooled down. The hydroxyl number of this polyol was in the range of from 80 mg/g to 88 mg/g when repeating this example, with an average of 84 mg/g.

Example 6

Polyurethane Dispersion 375 g of the polyol of example 2 were charged into a vessel together with 273 g of tetramethyl meta-xylylene diisocyanate (TMXDI) and heated to 90° C. The resulting reaction mixture was stirred at that temperature until the isocyanate concentration (mass fraction of isocyanate groups in the reaction mixture) was 1.5%. The prepolymer was cooled to 80° C., and 24.5 g of triethylamine were added. After fifteen minutes of homogenisation, 374 g of warm (40° C.) water were added within five minutes and subsequently to that, a mixture of 2.7 g of hydrazine and 47 g of water were added. The product was stirred for two hours at the resulting temperature and after that the formation of a polyurethane dispersion with a mass fraction of solids of 48% was complete. The dispersion had an acid number of 45 mg/g, a pH of a 10% strength dispersion in water of 8.8, a mass average particle size of 130 nm, and a dynamic viscosity of 900 mPa·s (measured at 23° C. and a shear rate of 100 $s^{-1}$).

Example 7

Polyurethane Dispersion 489 g of the polyol of example 3 were charged into a vessel together with 67 g of TMXDI and heated to 90° C. The resulting reaction mixture was stirred at that temperature until the isocyanate concentration was 1.49%. The prepolymer was cooled to 80° C., and 31.9 g of triethylamine were added. After fifteen minutes of homogenisation, 608 g of warm (40° C.) water were added within five minutes, and subsequently to that, a mixture of 8.3 g of 2-methyl-pentane diamine and 49 g of water was added. The product was stirred at the resulting temperature for two hours whereafter formation of the polyurethane dispersion was finished. Its mass fraction of solids was 44.3%, its acid number was 46 mg/g, and its pH was 8.9 (10% in water). The mass average particle size of the dispersion was 150 nm, and its dynamic viscosity, measured at 23° C. and a shear rate of 100 $s^{-1}$ was 450 mPa·s.

Example 8

Polyurethane Dispersion 515 g of the polyol of example 4 were charged together with 122 g of TMXDI and heated to 90° C. The resulting reaction mixture was stirred at that temperature until the mass fraction of isocyanate groups was 2.9%. The prepolymer was cooled to 80° C. and 36.5 g of triethylamine were added. After fifteen minutes of homogenisation, 698 g of warm (40° C.) water were added within five minutes and subsequently to that, a mixture of 23.2 g 2-methylpentane diamine and 334 g of water were added. The product was stirred at the resulting temperature for two hours whereafter the formation of the polyurethane dispersion was complete. Its mass fraction of solids was 38.6%, its acid number was 40 mg/g, its pH was 8.8 (as measured on a dispersion diluted to a mass fraction of solids of 10% with additional water), its mass average particle size was 147 nm, and its dynamic viscosity as measured at 23° C. and a shear rate of 100 $s^{-1}$ was 821 mPa·s.

Example 9

Polyurethane Dispersion 201 g of the polyol of example 5 were charged into a reactor together with 58 g of isophorone diisocyanate and heated to 80° C. The resulting reaction mixture was stirred at 80° C. until the isocyanate concentration was 3.5%, then 2 g of triethylamine were added. After fifteen minutes of homogenisation, 273 g of warm (40° C.) water were added within five minutes, and subsequently to that, a mixture of 40.5 g poly (oxypropylene) diamine with a specific content of amino hydrogen atoms of 8.7 mol/kg and a number average molar mass of 460 g/mol (JEFFAMINE® D-400 Polyetheramine; Huntsman Corporation) and 131 g of water were added. The product was stirred at the resulting temperature for two hours whereafter the formation of the polyurethane dispersion with a mass fraction of solids of 38.6% was complete. Its acid number was 32.4 mg/g, its pH (as measured on a dispersion diluted to a mass fraction of solids of 10% with additional water) was 8.4, its mass average particle size was 165 nm, and its dynamic viscosity as measured at 23° C. and a shear rate of 100 $s^{-1}$ was 240 mPa·s.

Example 10

Polyurethane Dispersion—Solvent-Containing, Comparative 383 g of the polyol of example 2 were charged together with 153 g of a polycarbonate polyol (®Desmophen XP 2586, Bayer Material Science, molar mass 1 kg/mol, OH number 112 mg/g, melting temperature 44° C.), 3.9 g of dimethylolpropionic acid and 67 g of N-ethyl-2-pyrrolidone, the mixture was heated to 80° C. and left under stirring to react for one hour, whereafter 112 g of isophorone diisocyanate were added under cooling to keep the temperature constant. At the end of the exothermic reaction the mixture was further stirred at 80° C. until the isocyanate concentration was 2.2%. 32.1 g of triethylamine were then added. After fifteen minutes of homogenisation, 955 g of warm (40° C.) water were added within five minutes and subsequently to that, a mixture of 6.5 g of 2-methylpentane diamine and 38 g water was added. The mixture was stirred for two hours at the resulting temperature whereafter the formation of the polyurethane dispersion was complete. Its mass fraction of solids was 36.4%, its acid number was 36 mg/g, its pH (as measured on a dispersion diluted to a mass fraction of solids of 10% with additional water) was 8.2, its mass average particle size was 150 nm, and its dynamic viscosity as measured at 23° C. and a shear rate of 100 s$^{-1}$ was 320 mPa·s.

Example 11

Preparation of Water-Dilutable Paints

White paints were prepared from the polyurethane-alkyd dispersions of Examples 6 to 10 in the following manner using suitable pigment pastes using the following formulations of table 1 (masses of constituents are normalised to 100 g of paint), where paints designated by "A" are formulated without siccative, and paints designated by "B" are formulated with siccative:

TABLE 1

Paint Formulations (masses of constituents in g)

| Example | | Dispersion | Siccative [1] | Flow Add. [2] | Defoamer [3] | Rheology Add. [4] | Pigment Paste [5] | Water [6] |
|---|---|---|---|---|---|---|---|---|
| 6 | A | 60 | 0 | 2 | 8 | 8 | 332 | 56 |
|   | B | 60 | 5 | 2 | 8 | 8 | 332 | 45 |
| 7 | A | 63 | 0 | 2 | 8 | 8 | 321 | 31 |
|   | B | 63 | 5 | 2 | 8 | 8 | 321 | 26 |
| 8 | A | 648 | 0 | 2 | 8 | 8 | 286 | 48 |
|   | B | 648 | 5 | 2 | 8 | 8 | 286 | 43 |
| 9 | A | 648 | 0 | 2 | 8 | 8 | 286 | 48 |
|   | B | 648 | 5 | 2 | 8 | 8 | 286 | 44 |
| 10 | A | 648 | 0 | 2 | 8 | 8 | 27 | 64 |
|   | B | 648 | 5 | 2 | 8 | 8 | 27 | 59 |
| C | A | 64 | 0 | 2 | 8 | 8 | 315 | 27 |
|   | B | 64 | 5 | 2 | 8 | 8 | 315 | 22 |

[1] siccative comprising a mass fraction of 6% of Co metal and 9% of Zr metal, as organic acid salts dissolved in white spirit
[2] flow and anti-cratering additive (acrylic copolymer)
[3] mineral oil based defoamer
[4] polyurethane based thickening agent
[5] pigment paste made according to the formulation of table 2
[6] deionised water The comparative dispersion C has been taken from EP 1 705 197 A1, example 9.

The binder was initially introduced into the mixing vessel, the pigment paste and the additives were then stirred in slowly and in portions, and finally the mixture was adjusted to the desired viscosity with water.

The formulation of the pigment paste (composition of 100 g of pigment paste) is given in table 2:

TABLE 2

Formulation of the pigment paste

| | |
|---|---|
| 17.4 g | of deionised water |
| 3.6 g | of a dispersing agent (nonionic polymer) |
| 1.7 g | of propylene glycol |
| 0.8 g | of a flow and wetting agent (acrylic copolymer) |
| 1.9 g | of a defoamer (wax emulsion) |
| 69.3 g | of titanium dioxide (rutile, mass fraction of TiO$_2$ is at least 94%, density 4.0 g/cm$^3$) |
| 5.3 g | of a rheology additive (polyurethane thickener) |

The constituents were stirred into the vessel in the stated sequence and then dispersed in a bead mill for approximately thirty minutes.

The paints had a mass fraction of solids approximately 48%. The ratio of the masses of pigment and binder was approximately 0.8:1.

The tack free time was measured on a coating applied with a 152 μm applicator gap (wet film thickness) on glass, at room temperature (23° C.).

Coating test results are summarised in table 3.

TABLE 3

Coating Test Results

| | Ex 6 | Ex 7 | Ex 8 | Ex 9 | Ex 10 | comparison |
|---|---|---|---|---|---|---|
| without siccative (A): | | | | | | |
| tack free time[2] in h | 8 | 7.5 | 5 | 5 | 5 | 16 |
| through drying[3] after 24 h | 2 | 3 | 6 | 5 | 6 | 1 |

TABLE 3-continued

Coating Test Results

| | Ex 6 | Ex 7 | Ex 8 | Ex 9 | Ex 10 | comparison |
|---|---|---|---|---|---|---|
| with siccative (B): | | | | | | |
| tack free time[2] in h | 3.5 | 3.5 | 3 | 5 | 3 | 5 |
| through drying[3] after 24 h | 4 | 4 | 7 | 6 | 7 | 3 |

[2] tack free time, measured according to ISO 1517-1973
[3] through drying, determined according to DIN 53 150

When a bent substrate made of polycarbonate having the form of a "U" was coated with a coating composition made from the dispersion of example 10, stress cracking was observed on the coated side of the polycarbonate substrate in the bend region. Such stress cracking was not observed when coating compositions based of the dispersions of examples 6 to 9 were used.

The invention claimed is:
1. A polyurethane P comprising
a moiety derived from a polyfunctional isocyanate F,
moieties derived from at least one of chain extenders I having at least two functional groups that can react with isocyanate groups and which are selected from the group consisting of water, hydrazine, dihydrazides of dicarboxylic acids, and diamines, and moieties derived from a hydroxyfunctional compound ABCDE made from a grafted fatty acid AB which in turn is made from a fatty acid A having at least one olefinic unsaturation, and grafted with a mixture B of olefinically unsaturated monomers which mixture comprises at least one acid-functional olefinically unsaturated monomer B1, wherein the grafted fatty acid AB has on average at least 1.1 acid groups per molecule, at least one polyhydric alcohol C having at least two hydroxyl groups, at least one polyfunctional acid D having at least two acid groups, and/or an anhydride thereof, and at least one fatty acid E.

2. The polyurethane P of claim 1, wherein the mixture B of olefinically unsaturated monomers additionally comprises at least one of olefinically unsaturated monomers B' capable of radical copolymerisation with the monomers B1, selected from the group consisting of acid functional monoesters B1' of aliphatic alcohols and olefinically unsaturated dicarboxylic acids, monomers B2 which are esters of aliphatic alcohols and olefinically unsaturated carboxylic acids, as well as diesters of olefinically unsaturated dicarboxylic acids, hydroxy functional esters B3 of di- and polyhydric alcohols and the olefinically unsaturated carboxylic acids, and aromatic vinyl compounds B4, and other copolymerisable vinyl compounds B5 selected from the group consisting of vinyl acetate, vinyl chloride, methyl vinyl ketone, methyl vinyl and allyl ethers, and (meth)acrylonitrile.

3. The polyurethane P of claim 1 further comprising a moiety derived from a polyhydric alcohol G having a molar mass of up to 2000 g/mol and at least two hydroxyl groups per molecule.

4. The polyurethane P of claim 1 further comprising a moiety derived from a dihydroxyalkanoic acid H having a sterically hindered acid group where the carbon atom carrying the carboxyl group is a tertiary or quaternary carbon atom.

5. The polyurethane P of claim 1 wherein the moieties derived from the chain extenders I are present in the polyurethane P in a mass fraction of between 0.5 and 10%.

6. The polyurethane P of claim 1 which additionally comprises moieties derived from at least one of monofunctional compounds J also referred to as chain stoppers that have only one group that is reactive towards isocyanate groups, and compounds K that have at least two different kinds of groups that have different reactivity towards isocyanate groups, selected from the group consisting of primary hydroxyl groups —CH2OH, secondary hydroxyl groups >CH(OH), tertiary hydroxyl groups >C(OH)—, primary amino groups —NH2, secondary amino groups >NH, and mercapto groups —SH, which are used to impart additional functional groups into the polyurethane.

7. A process to make the polyurethane P of claim 1 in a multi-step reaction, wherein, in the first step, a fatty acid A having at least one olefinic unsaturation is grafted with a mixture B of olefinically unsaturated monomers which mixture comprises at least one acid-functional olefinically unsaturated monomer B1, to provide a grafted fatty acid AB having on average at least 1.1 acid groups per molecule, in the second step, a compound ABCDE which is hydroxyfunctional is made by reacting with the grafted fatty acid AB at least one polyhydric alcohol C having at least two hydroxyl groups, and at least one fatty acid E, and additionally, at least one polyfunctional acid D having at least two acid groups, and/or an anhydride thereof, in the third step, a polyurethane P is made by reacting the hydroxy functional compound ABCDE with a polyfunctional isocyanate F, and optionally, a polyhydric alcohol G having a molar mass of up to 2000 g/mol and at least two hydroxyl groups per molecule, optionally, a dihydroxyalkanoic acid H having a sterically hindered acid group where the carbon atom carrying the carboxyl group is a tertiary or quaternary carbon atom, and at least one chain extender I having at least two functional groups that react with isocyanate groups, and optionally, at least one of monofunctional compounds J also referred to as chain stoppers that have only one group that is reactive towards isocyanate groups, and of compounds K that have at least two different kinds of groups that have different reactivity towards isocyanate groups, selected from the group consisting of primary hydroxyl groups —CH$_2$OH, secondary hydroxyl groups >CH(OH), tertiary hydroxyl groups >C(OH)—, primary amino groups —NH$_2$, secondary amino groups >NH, and mercapto groups —SH, which are used to impart additional functional groups into the polyurethane.

8. A method of use of the polyurethane P of claim 1 as binder resin in coating compositions, comprising providing an aqueous dispersion of P, which additionally contains at least one siccative S which is a salt of a transition metal from one of groups 3 according to the new IUPAC nomenclature, comprising Sc, Y, and La, to 12 according to the new IUPAC nomenclature, comprising Zn, Cd, Hg, of the periodic system of the elements, which selection includes the elements of the groups 4, 5, 6, 7, 8, 9, 10, and 11, or a salt of a rare earth metal, where each of the metals has at least two valence states, and an organic acid, adding at least one of a pigment, a filler, a flow additive, a levelling additive, a wetting additive, an antisettling agent, a light stabiliser, a coalescing agent, and an antioxidant, and applying the coating composition to a substrate by brushing, spraying, dipping, blade coating, roller coating, or curtain coating.

9. The method of use of claim 8 wherein the polyurethane P has a hydroxyl number of at least 20 mg/g, and wherein the coating composition further comprises a crosslinking agent L which is selected from the group consisting of blocked isocyanates L1, amino resin crosslinkers L2 based on at least partially etherified reaction products of organic amino compounds L21 and aliphatic aldehydes L22, and alkylcarbamoyl triazines L3.

10. A binder resin in a coating composition which comprises the polyurethane P of claim 1, comprising providing an aqueous dispersion of P, which additionally contains at least one siccative S which is a salt of a transition metal from one of groups 3 according to the new IUPAC nomenclature, comprising Sc, Y, and La, to 12 according to the new IUPAC nomenclature, comprising Zn, Cd, Hg, of the periodic system of the elements, which selection includes the elements of the groups 4, 5, 6, 7, 8, 9, 10, and 11, or a salt of a rare earth metal, where each of the metals has at least two valence states, and an organic acid, adding at least one of a pigment, a filler, a flow additive, a levelling additive, a wetting additive, an antisettling agent, a light stabiliser, a coalescing agent, and an antioxidant, and applying the coating composition to a substrate by brushing, spraying, dipping, blade coating, roller coating, or curtain coating.

11. The binder resin of claim 8 wherein the polyurethane P has a hydroxyl number of at least 20 mg/g, and wherein the coating composition further comprises a crosslinking agent L which is selected from the group consisting of blocked isocyanates L1, amino resin crosslinkers L2 based on at least partially etherified reaction products of organic amino compounds L21 and aliphatic aldehydes L22, and alkylcarbamoyl triazines L3.

12. A polyurethane P comprising a moiety derived from a polyfunctional isocyanate F, moieties derived from at least one of chain extenders I having at least two functional groups that can react with isocyanate groups which are selected from the group consisting of water, hydrazine, dihydrazides of dicarboxylic acids, and diamines, and moieties derived from a hydroxyfunctional compound ABCE, wherein the polyurethane P is made in a multi-step reaction in which:
  in the first step, a fatty acid A having at least one olefinic unsaturation is grafted with a mixture B of olefinically unsaturated monomers comprising at least one acid-functional olefinically unsaturated monomer B1, to provide a grafted fatty acid AB having on average at least 1.1 acid groups per molecule,
  in the second step, a compound ABCE which is hydroxyfunctional is made by reacting with the grafted fatty acid AB at least one polyhydric alcohol C having at least two hydroxyl groups, and at least one fatty acid E,
  in the third step, a polyurethane P is made by reacting the hydroxy functional compound ABCE with a polyfunctional isocyanate F,
  and at least one chain extender I having at least two functional groups that react with isocyanate groups selected from the group consisting of water, hydrazine, dihydrazides of dicarboxylic acids, and diamines, and optionally a polyhydric alcohol G having a molar mass of up to 2000 g/mol and at least two hydroxyl groups per molecule, optionally, a dihydroxyalkanoic acid H having a sterically hindered acid group where the carbon atom carrying the carboxyl group is a tertiary or quaternary carbon atom, and optionally at least one of monofunctional compounds J that have only one group that is reactive towards isocyanate groups, and optionally compounds K that have at least two different kinds of groups that have different reactivity towards isocyanate groups, wherein the groups are selected from the group consisting of primary hydroxyl groups —$CH_2OH$, secondary hydroxyl groups >CH(OH), tertiary hydroxyl groups >C(OH)—, primary amino groups —NH, secondary amino groups >NH, and mercapto groups —SH, which are used to impart additional functional groups into the polyurethane.

* * * * *